United States Patent

Guest

Patent Number: 6,027,125
Date of Patent: *Feb. 22, 2000

[54] TUBE COUPLING BODIES

[76] Inventor: John Derek Guest, "Iona", Cannon Hill Way, Bray, Maidenhead, Berkshire, United Kingdom, SL6 2EX

[ * ] Notice: This patent issued on a continued prosecution application filed under 37 CFR 1.53(d), and is subject to the twenty year patent term provisions of 35 U.S.C. 154(a)(2).

[21] Appl. No.: 08/872,614

[22] Filed: Jun. 10, 1997

[30] Foreign Application Priority Data

Jun. 14, 1996 [GB] United Kingdom ................. 9612441

[51] Int. Cl.[7] .............................. F16J 15/02; F16L 17/00
[52] U.S. Cl. ..................... 277/602; 277/609; 277/625; 277/634; 277/641; 285/110; 285/345; 285/351
[58] Field of Search .................................. 277/609, 616, 277/625, 626, 634, 635, 641, 642, 608; 285/110, 351, 345, 412, 413

[56] References Cited

U.S. PATENT DOCUMENTS

| | | | |
|---|---|---|---|
| 1,634,891 | 7/1927 | Trout | 385/351 |
| 2,491,004 | 12/1949 | Graham | 285/193 |
| 3,837,687 | 9/1974 | Leonard | 285/340 |
| 4,779,904 | 10/1988 | Rich | 285/345 |
| 5,228,702 | 7/1993 | Browne et al. | 277/608 |

FOREIGN PATENT DOCUMENTS 1491388  6/1998  France .

*Primary Examiner*—Anthony Knight
*Assistant Examiner*—Alison K. Pickard
*Attorney, Agent, or Firm*—Baker & Daniels

[57] ABSTRACT

A tube coupling having a throughway open at one end to receive a tube end, an annular groove encircling the throughway at a location spaced from said open end and an annular flexible sealing washer mounted in the groove and having an inner peripheral portion which projects through the open mouth of the groove to engage an outer surface of a tube which is a close fit in the throughway. The groove has one side nearest the open end of the throughway which lies in a plane generally transverse to the throughway to limit flexing of the inner part of the sealing washer towards the open end of the throughway and an opposite side of which is relieved at the mouth of the groove to allow the inner part of the sealing washer to take up a curvature in being deformed by forcing a tube through the washer. Thus the resulting stretching of the inner part of the washer by the tube provides a seal between the washer and tube and fluid pressure on the side of the sealing washer facing into the coupling body enhances the seal between the washer and tube.

6 Claims, 1 Drawing Sheet

TUBE COUPLING BODIES

BACKGROUND OF THE INVENTION

1. Field of the Invention

This invention relates to tube coupling bodies and in particular to coupling bodies having throughways open at one end to receive a tube and a seal mounted in the throughway to seal with the outer surface of the tube.

2. Background Prior Art

Conventionally an 0-ring seal or seals is provided in the coupling body as described, for example, in UK Patent Specification Nos. 15207742, 1573757, 2007322 and 2150243.

SUMMARY OF THE INVENTION

This invention provides a tube coupling having a throughway open at one end to receive a tube end, an annular groove encircling the throughway at a location spaced from said open end and an annular flexible sealing washer mounted in the groove and having an inner peripheral portion which projects through the open mouth of the groove to engage an outer surface of a tube which is closely fitted within the throughway, the groove having one side nearest the open end of the throughway which lies in a plane generally transverse to the throughway to limit flexing of the inner part of the sealing washer towards the open end of the throughway and another opposite side which is relieved at the mouth of the groove to allow the inner part of the sealing washer to take up a curvature in being deformed by forcing a tube through the washer so that the resulting stretching of the inner part of the washer by the tube causes the washer to seal with the tube and fluid pressure on the side of the sealing washer facing into the coupling body enhances the sealing action of the washer with the tube.

In the preferred arrangement according to the invention the outer peripheral part of the sealing washer is in sealing engagement with the bottom or outer peripheral part of the groove.

More specifically the sealing washer may be formed with an annular ridge adjacent the outer periphery of the washer which seals with a side of the groove.

In one particular construction according to the invention the ridge may project on one side of the washer and a corresponding recess is formed in the other side of the washer and one side of the groove is formed with an annular ridge which engages the washer adjacent the recess so that both sides of the sealing washer are sealed in the groove.

In any of the above arrangements a stack of said sealing washers may be provided having annular sealing ridges on one side thereof, the washers being mounted side by side in the groove so that the ridges form a seal between the washers and also space the washers apart to allow the inner peripheral portions of the washers to flex independently and seal with the outer surface of a tube in the throughway.

Also in any of the above arrangements the relief formed on said another side of the groove at the mouth of the groove may be in the form of an annular recess formed around said another side of the groove at the mouth of the groove.

The sealing washing may be formed from polytetrafluoroethylene strip, nylon, polyethylene or aluminum foil.

DESCRIPTION OF THE PREFERRED EMBODIMENTS

Figure 1:
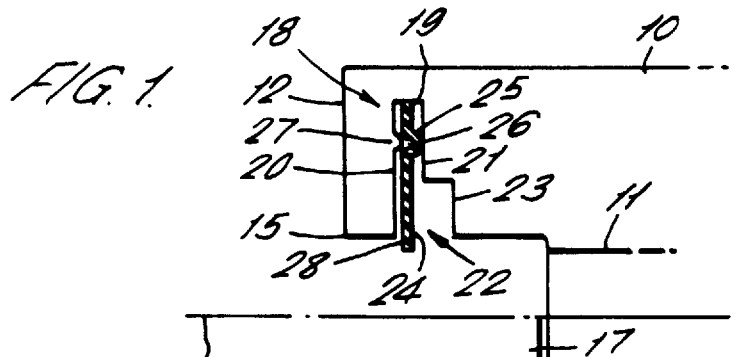
FIG. 1 is a diagrammatic view of a tube coupling body having a throughway to receive an end part of a tube and an encircling seal mounted in the throughway to seal with the outer surface of the tube shown both with and without the tube present.
Figure 2:
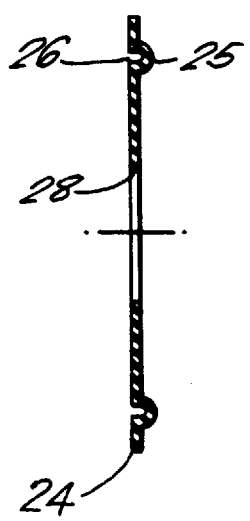
FIG. 2 is a side view of an annular sealing washer for use in the coupling body of FIG. 1.
Figure 3:
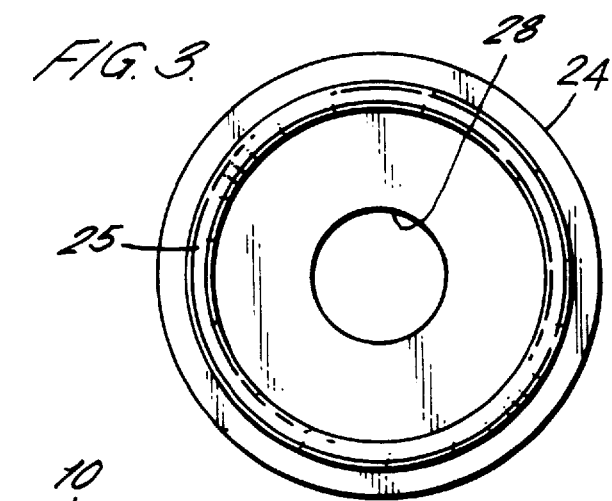
FIG. 3 is a front view of the sealing washer of FIG. 2.

Referring firstly to FIG. 1 of the drawings, there is shown a tube coupling body 10 having a throughway 11 extending into the coupling body from one end 12 thereof. At a location spaced from the end 12 of the coupling body, the throughway is stepped up in diameter at 13 to form an enlarged end diameter portion 14 which extends to an opening 15 in the end wall 12 of the body. A tube 16 has an end part 17 which is inserted into the enlarged end portion 14 of the throughway. The tube abuts against step 13 in the throughway and the outer diameter of the tube is such that it is closely fitted within the enlarged diameter portion of the throughway.

The enlarged diameter portion 14 of the throughway is formed partway between the open end 15 and the step 13 with a deep encircling annular groove 18 having a closed bottom or outer peripheral wall 19, side walls 20 and 21 and a mouth 22 where the groove opens to the throughway. The side 20 of the groove lies in a plane extending generally transversely of the throughway. The opposing side 21 is closely spaced and parallel to the side 20 adjacent the bottom or outer peripheral wall of the groove and is formed with an annular recess 23 adjacent the mouth of the groove to form a wider entry to the groove.

An annular thin section flexible sealing washer 24 is mounted in the groove, the washer is formed with a moulded or cold-formed ridge 25 adjacent its outer periphery with an annular recess 26 on the opposite side 20 of the groove. The side of the groove 18 is formed with an annular raised ridge 27 in the narrower part of the groove adjacent the groove bottom or outer peripheral wall 19 which engages in the recess 26 in the sealing washer 24 and holds the ridge 25 of the washer in sealing engagement with the opposite side wall 21 of the groove. The washer is therefore mounted in its relaxed condition closely spaced from the wall 20 of the groove which limits flexing of the washer towards the open end of the throughway.

The washer projects through the mouth of the groove into the throughway and the inner diameter 28 of the washer is formed with a slightly smaller diameter than the outer diameter of the tube 16 with which the washer is to engage. Thus, when the tube is forced into the throughway, as shown in the lower part of FIG. 1, the washer takes up the curve formation indicated extending across the recess 23 at the mouth of the groove and the inner diameter of the washer forms a sealing engagement with the tube. Fluid pressure upstream of the sealing washer in the coupling body bears on the enclave surface of the sealing washer facing into the coupling body to enhance the sealing action of the washer with the tube. Loss of the fluid around the outer side of the washer is prevented by the sealing engagement of the ridge 25 with the side 21 of the groove and the ridge 27 with the recess 26 in the washer.

The flexible walled sealing washer is formed by piercing, blanking and then cold-forming out of thin polytertrafluroethylene sheet or could be moulded in plastics such as a nylon or polyethylene or can be pierced, blanked and formed in a metal such as aluminium foil.

Figure 4:
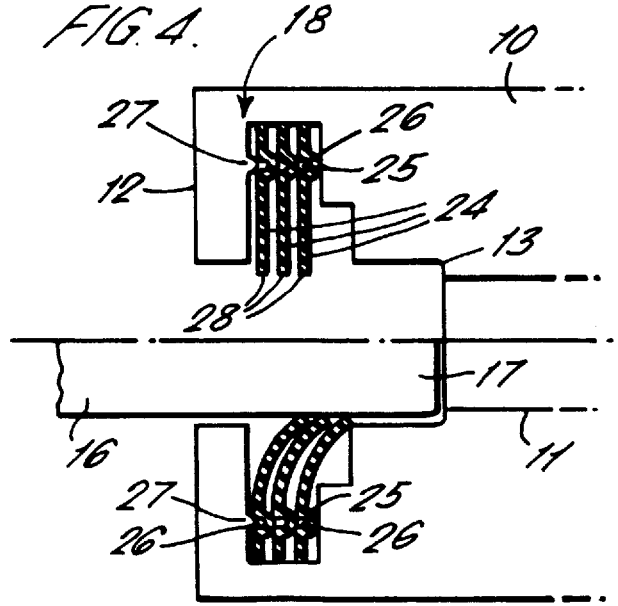
FIG. 4 is a similar view to that of FIG. 1 showing an alternative arrangement embodying multiple annular seals.

FIG. 4 of the drawings shows an alternative arrangement in which the outer part of the groove 18 adjacent the groove bottom or outer peripheral wall 19 is widened to accommodate a stack of three sealing washers as described above. The ridge 25 on one washer engages the next washer in the region of the recess 26 but does not enter the recess so that the washers are held spaced apart from one another. This arrangement provides a seal between adjacent washers and also permits the washers to flex separately when a tube is inserted through them and to seal independently with the surface of the tube, as described for the single washer of the FIG. 1 embodiment described earlier.

It will be appreciated that because the sealing washer has an internal diameter which is smaller than the tube outside diameter, as the tube is inserted, the washer is deformed by the tube into a curved or conical shape. The conical deformation of the washer creates stresses in the washer which provide the initial sealing pressure on the tube. This sealing pressure is increased as the internal fluid pressure increases thereby maintaining an effectively proof seal.

The thin washer, being inherently flexible, allows the tube to be inserted with very small effort or force in addition, a low friction material such as polytertrafluroethylene further reduces the assembly effort required, this obviously provides an advantage for the connector particularly when coupled with the "avalanche" feature of my European Patent Publication No. 0667480 where the initial "avalanche" effort can be reduced but still provide a significant difference in level of effort over that of pushing a tube into a conventional seal.

I claim:

1. A tube coupling having a throughway open at one end to receive a tube end, an annular groove encircling said throughway at a location spaced from said open throughway end, an annular flexible sealing washer located between spaced first and second sides of said groove, and means for sealing the sides of said washer to the respective said sides of said groove, said washer having an inner peripheral portion which projects through the open mouth of said groove, the inner periphery of said washer engaging an outer surface of a tube which is closely fitted within said throughway, said first groove side being located nearest said open throughway end and lying in a plane generally transverse to said throughway, said washer being located adjacent said first groove side, flexing of said inner peripheral washer portion towards said open throughway end big limited by said first groove side, said second groove side opposite said first groove side and having an annular recess at said mouth of said groove, said groove increased in width at said mouth by said annular recess whereby said inner peripheral washer portion is allowed to take up a curvature adjacent its inner periphery on forcing a tube of slightly greater diameter than the inner diameter of said washer through said throughway and said washer, deformation of said inner peripheral washer portion by said tube providing a seal between said washer inner periphery and the outside surface of the tube, and wherein the seal between said washer and the tube is enhanced by fluid pressure on the side of said sealing washer facing into said coupling body.

2. A tube coupling as claimed in claim 1, wherein an outer peripheral portion of said sealing washer is in sealing engagement with an outer peripheral part of said groove.

3. A tube coupling body as claimed in claim 1, wherein said sealing washer is formed from polytetrafluoroethylene strip, NYLON, polyethylene or aluminum foil.

4. A tube coupling having a throughway open at one end to receive a tube end, an annular groove encircling said throughway at a location spaced from said open throughway end, and an annular flexible sealing washer located between spaced first and second sides of said grooves an outer peripheral portion of said sealing washer in sealing engagement with an outer peripheral part of said groove, said washer having an inner peripheral portion which projects through the open mouth of said groove, the inner periphery of said washer engaging an outer surface of a tube which is closely fitted within said throughway, said first groove side being located nearest said open throughway end and lying in a plane generally transverse to said throughway, said washer being located adjacent said first groove side, whereby flexing of said inner peripheral washer portion towards said open throughway end is limited, said second groove side opposite said first groove side and relieved at said mouth of said groove, whereby said groove is increased in width at said mouth to allow said inner peripheral washer portion to take up a curvature adjacent its inner periphery on forcing a tube of slightly greater diameter than the inner diameter of said washer through said throughway and said washer, deformation of said inner peripheral washer portion by said tube providing a seal between said washer inner periphery and the outside surface of the tube, and wherein said sealing washer is formed with an annular ridge adjacent the outer periphery of said washer which is in sealing engagement with a side of said groove and the seal between said washer and the tube is enhanced by fluid pressure on the side of said sealing washer facing into said coupling body.

5. A tube coupling body as claimed in claim 4, wherein said ridge projects from a side of said washer and a corresponding recess is formed in a second, opposite side of said washer, and one of said first and second sides of said groove is formed with an annular ridge which engages said washer adjacent said washer recess so that both sides of said sealing washer are sealed in said groove.

6. A tube coupling body having a throughway open at one end to receive a tube end, an annular groove encircling said throughway at a location spaced from said open throughway end, and a plurality of annular flexible sealing washers having annular sealing ridges on one side thereof mounted side-by-side in said groove between spaced first and second sides of said groove, said washers each having an inner peripheral portion which projects through the open mouth of said groove, the inner periphery of each said washer engaging an outer surface of a tube which is closely fitted within said throughway, said ridges providing a seal between said washers and spacing said washers apart, whereby said inner peripheral portions of said washers are allowed to flex independently and seal with the outer surface of the tube in said throughway, said first groove side being located nearest said open throughway end and lying in a plane generally transverse to said throughway, one of said washers being located adjacent said first groove side, whereby flexing of said inner peripheral portion of said one washer towards said open throughway end is limited, said second groove side opposite said first groove side and relieved at said mouth of said groove, whereby said groove is increased in width at said mouth to allow the said inner peripheral portions of said washers to take up a curvature adjacent their respective inner peripheries on forcing a tube of slightly greater diameter than the inner diameters of said washers through said throughway and said washers, deformation of said inner peripheral washer portions by said tube providing a seal between said washer inner peripheries and the outside surface of the tube, and wherein the seal between said washers and the tube is enhanced by fluid pressure on the side of a said sealing washer facing into said coupling body.

* * * * *

UNITED STATES PATENT AND TRADEMARK OFFICE
CERTIFICATE OF CORRECTION

PATENT NO.   : 6,027,125
DATED        : February 22, 2000
INVENTOR(S)  : John Derek Guest It is certified that error appears in the above-identified patent and that said Letters Patent is hereby corrected as shown below:

Claim 1, column 3, line 45, delete "big" & substitute therefor --being--

Claim 4, column 4, line 2, delete "grooves" & substitute therefor --groove--

Signed and Sealed this

Twenty-eighth Day of November, 2000

Attest:

Q. TODD DICKINSON

Attesting Officer

Director of Patents and Trademarks